United States Patent [19]

Krawczyk

[11] 4,167,732

[45] Sep. 11, 1979

[54] MULTI-APARTMENT BUILDING COMBINATION COMMUNICATION AND SECURITY CIRCUIT

[76] Inventor: Axel J. Krawczyk, 15 Rochester Ave., Long Beach, N.Y. 11561

[21] Appl. No.: 820,459

[22] Filed: Aug. 1, 1977

[51] Int. Cl.² .............................................. G08B 25/00
[52] U.S. Cl. .............................. 340/524; 340/286 R; 340/310 R; 340/531
[58] Field of Search .................... 340/213 R, 328, 286, 340/298, 310 R, 311, 312, 313, 276, 328, 524, 531

[56] References Cited

U.S. PATENT DOCUMENTS

| | | | |
|---|---|---|---|
| 324,369 | 8/1885 | Edwards | 340/310 R |
| 3,404,393 | 10/1968 | Blivice | 340/310 R |
| 3,810,163 | 5/1974 | Arnold et al. | 340/310 R |
| 3,978,468 | 8/1976 | Bond et al. | 340/310 R |

Primary Examiner—John W. Caldwell, Sr.
Assistant Examiner—D. L. Crosland
Attorney, Agent, or Firm—Bauer & Amer

[57] ABSTRACT

In a building with multiple apartments, wherein there is a "call button and reply," i.e. a communication circuit between the apartments and a lobby area of said building, additional use is made of most of the wiring of said circuit for security purposes. Moreover, in its implementation, the circuit includes a separate light or other emergency signalling device that is associated with each of the apartment call button contacts, so that when said light is illuminated, this not only indicates the existence of an emergency in an apartment but said particular apartment, as distinguished from all the other apartments, is also automatically identified because of its association with said particular call button.

1 Claim, 3 Drawing Figures

MULTI-APARTMENT BUILDING COMBINATION COMMUNICATION AND SECURITY CIRCUIT

The present invention relates generally to an improved system, in the specific form of a circuit, of providing adequate security for a modern apartment building, and more particularly to a combination "call button and reply" and emergency security circuit between the apartments and lobby area of said building.

To minimize the entry into a multi-apartment building of uninvited guests or the like, the building will typically have the necessary wiring installed to transmit a signal, i.e. to operate a buzzer or bell, from the lobby to a selected apartment, which signal can be responded to by the transmission of an electrical pulse from that apartment to a door-opener. It is already recognized, as for example in prior U.S. Pat. No. 3,952,294, that the existing wiring of the lobby-to-apartment circuit, i.e. call button or communication circuit, can be advantageously used for more than to open a lobby door. Thus, in the noted patent, the existing wiring is embodied in a smoke detection system, and thus affords some protection for the apartments against fire, whether occupied or not at the time. These known combination communication and security circuits, however, function by providing for the operation of an alarm in addition to the operation of the referred-to door-opener. Among other shortcomings, the operation of such an alarm, as is also the case of the door-opener, while obviously being initiated in a particular apartment, does not reveal the identification of the particular apartment. To achieve apartment-identification of the emergency, whether it be a fire unauthorized entry or the like, the prior art circuitry is significantly modified, such that any savings derived from use of existing, installed wiring, is more than offset by the additional costs of the modifications applied thereto.

Broadly, it is an object of the present invention to provide a combination circuit transmitting signals from lobby-to-apartment and from an identified apartment-to-lobby overcoming the foregoing and other shortcomings at the prior art. Specifically, it is an object to provide a circuit that utilizes existing wiring between the apartments and a lobby area for transmitting signals there between, which wiring with simple and relatively easy to apply modifications can particularize an emergency situation in any one of the apartments, and which still provides its conventional function of permitting effective communication between the lobby and any selected apartment.

Achieving the foregoing with existing wiring is due to a number of noteworthy aspects of the circuit implementing the within invention. One such noteworthy aspect is the recognition that while the individual electrical circuits which provide the communication and security functions, of course, have to be energized by an electrical source, that a DC source should be selected for this purpose and that by using a reverse polarity for each of the individual circuits in conjunction with a properly biased diode, that this can effectively avoid the inadvertent powering of one circuit while the other circuit is operating.

Another noteworthy aspect is the use of a main switch in the security circuit that is normally closed with the result that the circuit therefore is in imminent condition to be operated, as when this circuit is completed by the closing of a security switch in an apartment. Thus, the security function is provided during non-operation of the communication circuit, which is the prevalent situation. To put it another way, the communication circuit is the one having the discontinuity embodied therein in the form of the normally open call button, and said discontinuity is removed, of course, by the closing of the call button when it is desired to use the communication circuit, and this, fortunately, is required to be done infrequently as a practical matter.

Another distinguishing feature which contributes to the effectiveness of the within combined communication and security circuit is the interrelation of the operation of a selected normally open call button switch with the referred to normally closed switch of the security circuit. That is, it is only when a normally open call button is closed that the normally closed switch is opened, and thus it is that only when the communication circuit is operational is the security circuit non-operational. Thus, from a practical point of view, the communication circuit which is infrequently used has, as it should, the normally open call button switches, whereas the security circuit which should be in a condition to provide an emergency signal at all times is, in actual fact, in condition to do so, because it embodies the normally closed switch and has as the only open switch therein the apartment security switch, which switch, of course, identifies the existence of an emergency by its closing.

A combination communication and security circuit for a multi-apartment building demonstrating objects and advantages of the present invention is of the type having for each apartment therein a communication circuit for transmitting an electrical signal from a lobby area thereof to a signalling device in a selected apartment and for transmitting an electrical signal from said apartment back to said lobby area. The communication circuit includes a cooperating pair of first and second conductors respectively connected from positive and negative battery terminals of a communication circuit direct current source to operate said signalling device when a normally open pair of contacts of a call button associated with said apartment is closed by the operation of a cooperating call button. In combination therewith, there is provided a security circuit for transmitting an electrical signal indicative of an emergency condition in an identified one of said apartments to said lobby area, said security circuit comprising a security circuit direct current battery source electrically connected in a relation of reversed polarity to said first and second conductors for establishing signal-transmitting contact with each said apartment. Additionally, a separate emergency condition-signalling means is provided for each said apartment that is effective to identify the one of said apartments having an emergency by virtue of it being operatively associated with a cooperating one of said call button contacts. Completing the combined circuit is a first control circuit in each apartment electrically connecting said direct current battery source of both said communication and security circuits to said first and second conductors, but allowing selected operation of only one said circuit at a time, said first control circuit having a diode electrically connected therein with an electrical bias permitting signal transmissions only in the polarity of said communication circuit direct current source so as to obviate the inadvertent operation of said signalling device by said polarity of said security circuit direct current source and further including a simultaneously operated normally closed switch in said communication circuit and a normally open emergency switch in said security circuit. A second control circuit in said lobby area for each said apartment is similarly electrically connected to apply said direct current battery source to said first and second conductors and has a cooperating pair of simultaneously operated normally closed and normally open switches electrically connected therein, said normally open switch being said apartment call button switch and said normally closed switch being in said circuitry circuit. As a consequence, except when a call button is operated, said security circuit is in condition for imminent operation whenever a normally open emergency switch of an apartment first control circuit is operated.

The above brief description, as well as further objects, features and advantages of the present invention will be more fully appreciated by reference to the following detailed description of a presently preferred, but nonetheless illustrative embodiment in accordance with the present invention, when taken in conjunction with the accompanying drawings, wherein.

Figure 1:
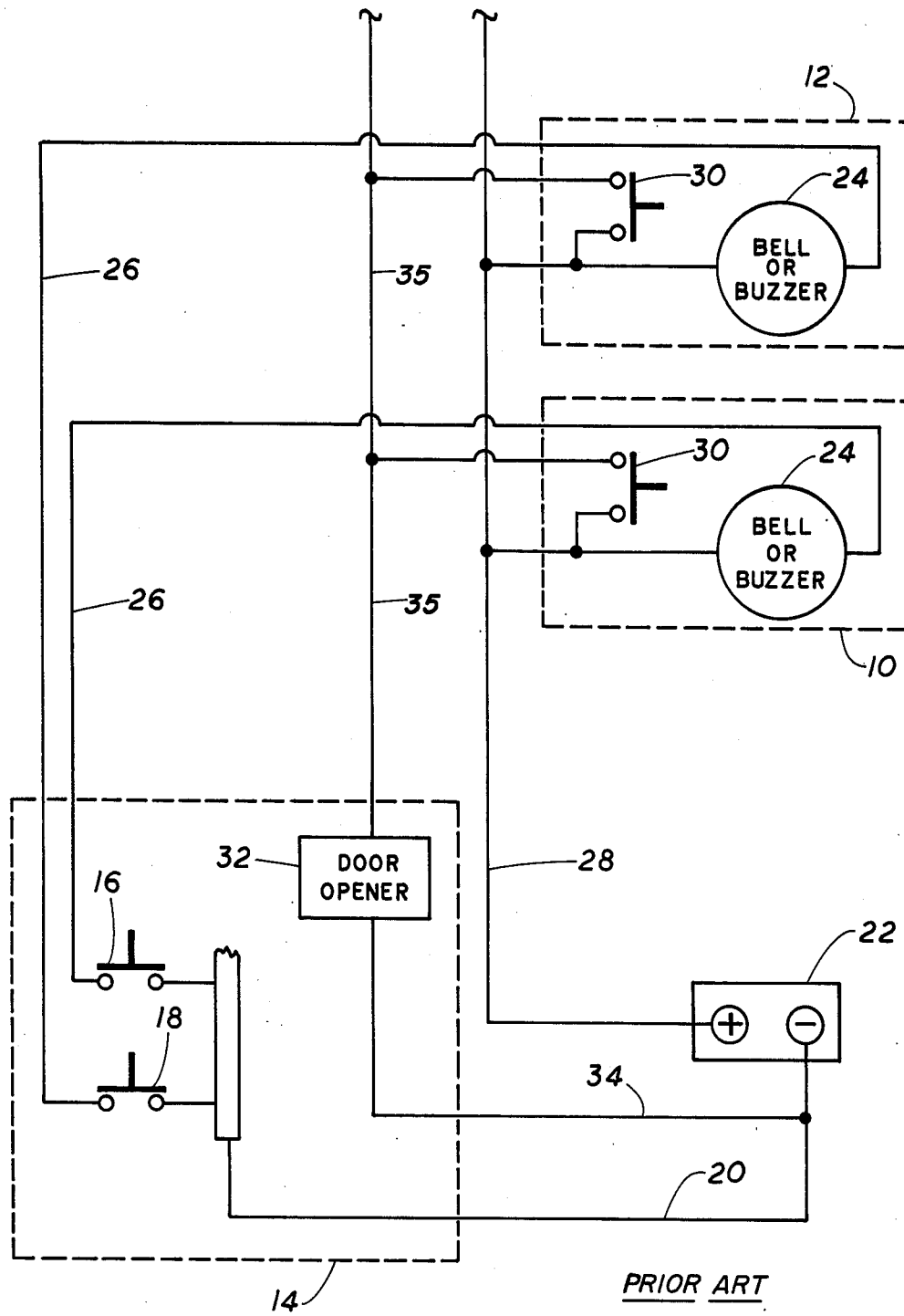
FIG. 1 is a circuit diagram of a typical "call button and reply" or communication circuit, to which additions are recommended, in accordance with the present invention, to achieve a security function therefrom.

The invention will be explained in connection with a progressively modified circuit diagram of a currently used typical visitor's call button and reply circuit, or "communication" circuit, for an apartment building. The invention resides at least in part in the use of a significant amount of the wiring of this call button and reply circuit to also provide a security system for the individual apartments. As will be better understood as the description proceeds, the security system or circuit is one which will alert a security guard or other such person in a lobby or other selected location to an emergency situation, which could be a fire or an unauthorized entry, in relation to a particular apartment in the building. Thus, assuming the fire is the emergency, the within system will provide the apartment location of the fire. This is important in a building with multiple apartments since considerable damage can be caused, and the fire may even get out of control, before it is determined in what particular apartment the fire exists. The particularization of the emergency, as well as other benefits, is therefore a significant contribution of the within invention.

Part of the inventive contribution is also the recognition that a typical communication circuit is actually used very little of the time. Thus, said circuit according to the present invention is used during its "non-use" as a call button and reply or communication circuit for security purposes and, as a practical matter, this occurs for a major portion of the time, which is as it should be for most city dwellers who are not at home during workdays, etc. Stated another way, the only time that the circuit does not function for security purposes is when it is used to establish communication, and since this occurs very infrequently, as when visitors are calling upon the apartment occupant, this does not detract from the advantageous use that is made of the wiring that exists in the building for security purposes.

CIRCUIT OF FIG. 1

A typical so-called "call and reply" or communication circuit is illustrated in this figure. Although only illustrated in connection with apartments 10 and 12, it will be understood that the circuitry is appropriately extended to function in connection with all of the other apartments of the building. Said FIG. 1 communication circuit includes in the lobby area 14, a call button 16 particularized for the apartment 10, button 18 for apartment 12, etc.

Assuming that button 16 is depressed, conductor 20 connected from the negative of the source 22 is completed across the now closed contacts of the button 16 and thus a signal is transmitted to the apartment 10 bell or buzzer 24 via the conductor 26. The circuit to the source 22 through the bell 24 is completed via the conductor 28. As a result, bell 24 rings within the apartment 10 requiring a response of the occupant if he is on the premises. Assuming this is the situation, the occupant will depress reply button 30 in his apartment which completes a circuit for the door opener 32 in the lobby area 14. More particularly, the circuit consists of previously noted source 22, conductor 34 connected from the negative terminal to the door opener 32, the wire or conductor 35 connected from the door opener 32 to the reply button 30, and finally the wire or conductor 28 connected to the positive terminal of the source 22.

The same communication circuit will be understood to be provided for the apartment 12 and all the other apartments. Thus, features similar to those already described are designated by the same reference numeral in connection with apartment 12.

Having in mind the objective of the within invention, it can be appreciated from FIG. 1 that the communication circuit as just described requires modification in order to be used for security purposes. For example, if it is assumed that button 30 is a normally open smoke switch and is thus closed in the presence of smoke, it should be readily appreciated that upon the closing thereof all that occurs is that the signal is supplied to a receiving device which, instead of the door-opener 32, could be a light or other such alarm. While this signal is provided in the lobby area 14, which is desirable, it is not individually associated with the apartment 10, and thus there is no way that the security guard in the lobby 14 can determine from what apartment the signal was transmitted.

At this point it is therefore appropriate to note that part of the inventive contribution is the recognition that an effective security system can be created from a typical "call and reply" or communication circuit provided that the signal from the particular apartment is transmitted to the lobby 14 not through the wiring which includes the door-opener 32, but rather through the wiring which includes the apartment-associated buttons 16, 18, etc. In this manner, the signal which is received in the lobby 14 is associated with a particular apartment the same way as button 16 is associated with apartment 10, button 18 with apartment 12, etc.

CIRCUIT OF FIG. 2

Figure 2:
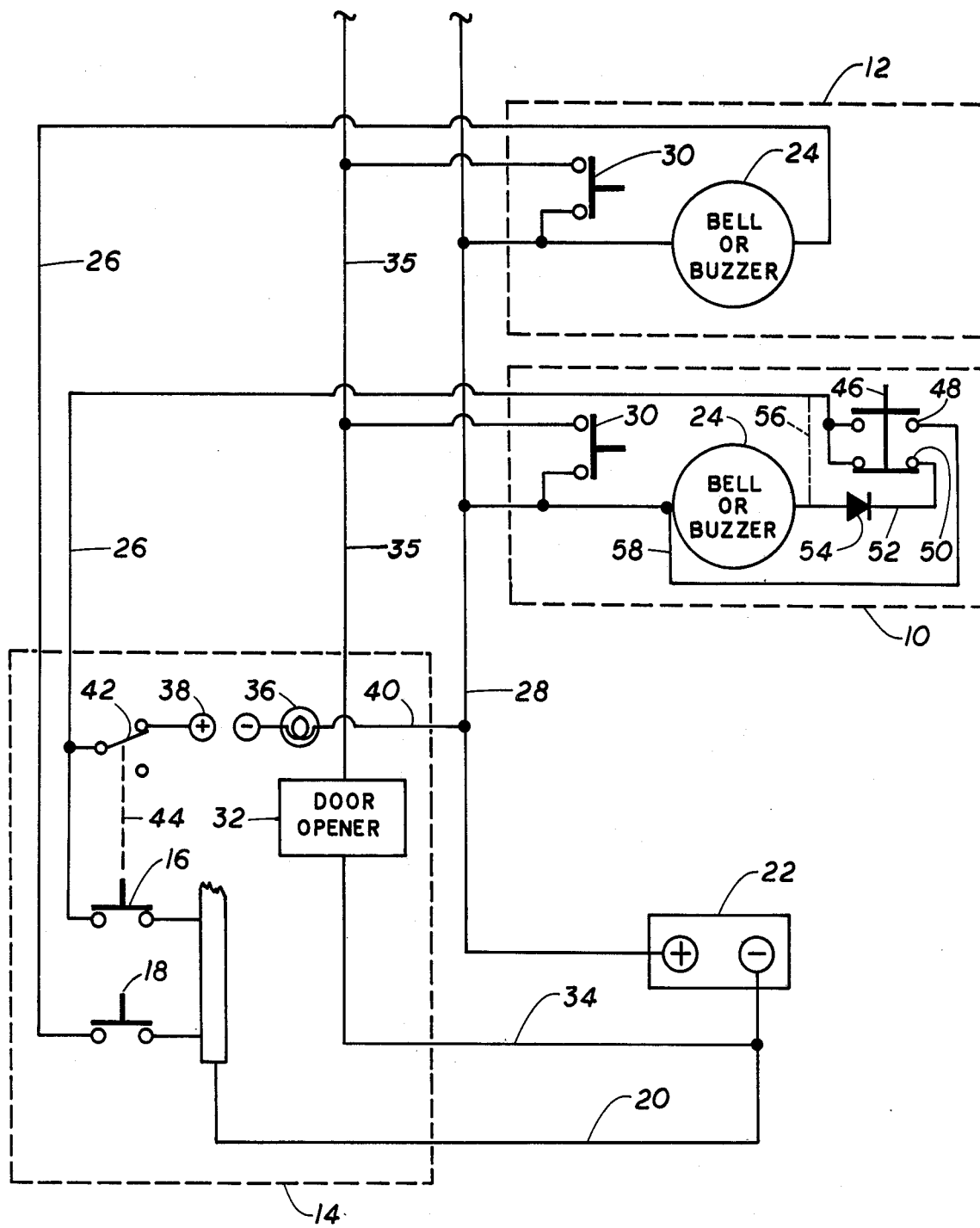
FIG. 2 is similarly a circuit diagram, but of a basic combination communication and security circuit for a multi-apartment building according to the present invention, utilizing much of the wiring of said FIG. 1 circuit.

What is illustrated in FIG. 2 is the implementation of the aforesaid concept and also the application of solutions to various problems which are presented by trying to keep intact the function of the communication circuit of FIG. 1 and yet allow the utilization of the same, but in the reverse aspect noted when used for security purposes. The modified circuit of FIG. 2 is illustrative of the implementation of the invention, but will be understood to be a greatly simplified version thereof. This will be better understood and more apparent as the description proceeds.

The basic modifications required of the typical FIG. 1 communication circuit to enable it to function as a security circuit will now be noted in the separate paragraphs that follow.

The electrical source should be direct current. In many existing installations, it is alternating current and thus must be changed.

An appropriate sound or visual signal, such as a bell or lamp 36 associated with each call button must be provided. In FIG. 2, lamp 36 is shown associated with button 16 which in turn provides an association between lamp 36 and apartment 10. Lamp 36 is provided with its own DC source 38 and is electrically connected by conductor 40 between existing lines 28 and 26. It should be noted that line 40 includes a normally closed switch 42 which in the simplified version of FIG. 2 is illustrated as being mechanically associated via connecting member 44 with the call button 16 of apartment 10.

In each apartment, as exemplified by apartment 10, there is installed an appropriate alarm switch 46. This switch has normally open contacts 48, which are closed only in an emergency situation, and also has normally closed contacts 50 for completing a bypass circuit for the switch 46 that is necssary during operation of the call bell 24. This bypass circuit consists of conductor 52 and a diode 54 having the biasing indicated. Since the bypass circuit 52 is utilized, the previously used bell circuit wiring designated 56 should be removed, and such removal is signified by the phantom perspective illustration of conductor 52 in FIG. 2.

With the few just noted modifications illustrated in FIG. 2 of the FIG. 1 "bell and reply" or so-called communication circuit, it is possible to achieve a security function from the wiring 26, 35 already existing between the lobby 14 and the various apartments 10, 12 of a building, as well as having the traditional bell and reply function provided by this wiring.

MODE OF OPERATION OF SAID FIG. 2 CIRCUIT

Assume that emergency switch 46 is either a manually operated "panic" switch of the type that a teller in a bank would operate in an emergency situation, or is a normally open smoke detector switch which is closed in the presence of smoke, or is a normally open window switch which is closed upon unauthorized movement of the window from its closed into its open position, or some other similar type of security device. Whatever type of normally open switch, assume that there occurs an emergency which results in the normally open contacts 48 of switch 46 closing, i.e., being closed by a switch arm bridging across these contacts. A circuit tracing will verify that from the right-hand contact of switch 48 a signal is transmitted via conductor 58 to conductor 28, to conductor 40, through lamp 36 to the negative terminal of the DC source 38. Continuing with the circuit tracing, the positive terminal of source 38 is connected via closed switch 42 through conductor 26 to the left-hand contact of switch 48. Thus, the closing of the contacts 48 of switch 46 results in the completion of the circuit enabling source 38 to energize and thus operate the emergency signalling light or device 36. Since light 36 is provided for apartment 10 and, in like manner each apartment has its own light, it follows that the energizing of light 36 indicates an emergency situation in apartment 10 as distinguished from any other apartment.

During the time that contact 48 of switch 46 is closed, it should be noted that source 38 does not transmit a signal to the bell 24 because contacts 50 have been opened, thus isolating bell 24 from the source 38. This could be important if switch 46 was a panic switch, since the sounding of the bell 24 in the apartment 10 might provoke an intruder into taking violent or other undesirable action.

Although perhaps redundant, it should be noted that in the open condition of button 16 there is no operation of either the bell ringing or the reply function of the wiring 26 and 35. This necessarily follows since wire 34 connected from the negative terminal of source 22 is connected to the open reply button 30, while the other wire 20 connected to said negative terminal is connected to the open button 16.

Let it now be assumed that button 16 is operated by a visitor calling upon the occupant of apartment. When button 16 is depressed this results in the opening of switch 42 and the temporary placement of the security circuit in a non-operational condition. This is necessary since the existing wiring 26, 35 and 28 must now be used for purposes of the call bell and reply function. In this regard, the closing of button 16 completes a circuit from the negative terminal of source 22 via conductor 20, the button 16, conductor 26, the normally closed contacts 50 of switch 46, and the conductor 52 to the diode 54. At this point it should be noted that since the circuit just traced is to the negative terminal of source 22, that current will flow through the diode 54 because of the biasing applied thereto. Thus, the signal proceeds to the bell 24 and returns to the source 22 via the conductor 28. Thus the circuit is completed between the source 22 and the bell 24, and the bell accordingly operates.

In response to the ringing of the bell 24 the occupant of apartment 10 will then depress the reply button 30. This completes a circuit which for purposes of this discussion should be traced from the positive terminal of source 22. In doing so, it will be noted that this circuit is completed from this positive terminal through the conductor 28, through the depressed reply button 30 and back through the wire 35 which includes the door-opener 32 through the conductor 34 connected to the negative terminal of the source 22.

From the foregoing is should therefore be readily understood that wiring 26, 36 and 28 which exists in the building effectively provides its traditional call bell and reply function and also a security function.

A final item perhaps requiring explanation is the reason for the use of a biased diode 54. This is primarily to prevent inadvertent or undesirable operation of the bell 24 when the circuitry is providing its security function. More particularly, when this security function is provided as already noted the switch 42 is closed. Thus source 38 is connected via this closed switch 42 via line 26 and via the closed contact 50 to the diode 54. If a signal could at this time pass the diode 54 this, of course, would connect the bell 24 via the conductors 28 and 40 across the voltage potential of the source 38 and thus result in operation of the apartment bell 24. This does not occur, however, because the positive terminal of source 38 is connected via conductor 52 to the diode 54, and diode 54 having the biasing illustrated is therefore effective in preventing any positive signal from being transmitted further down the conductor 52 to the bell 24.

CIRCUIT OF FIG. 3

Figure 3:
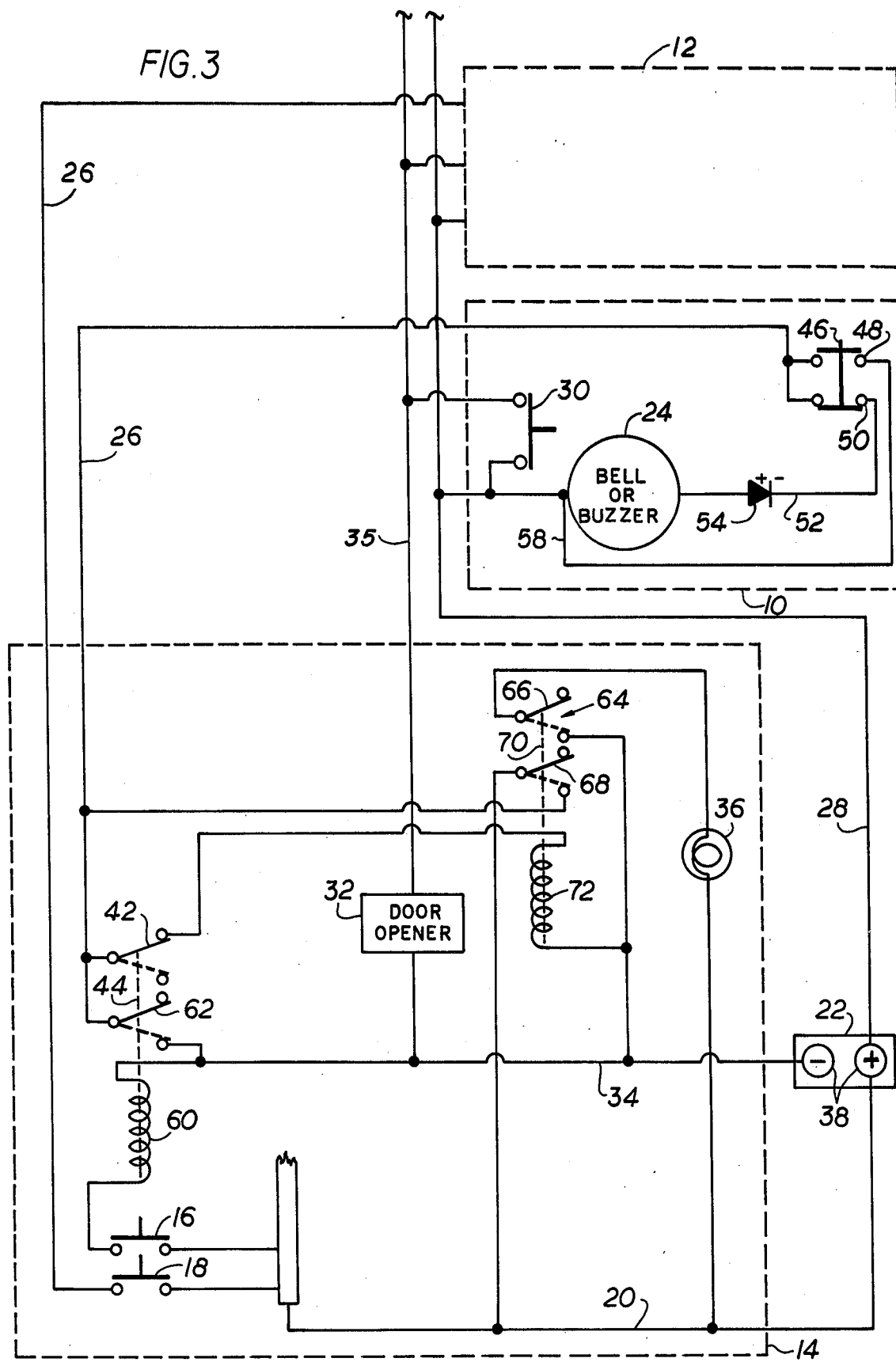
FIG. 3 is a circuit diagram of an advanced version of the inventive combination circuit hereof.

FIG. 3 embodies the essential aspects of FIG. 2 and, in addition embodies certain conventional techniques which although in and of themselves are not inventive, are techniques which enhance the operation of the inventive concepts embodied in the circuitry of FIG. 2. For example, it is obviously desirable that even after the emergency switch 46 returns to its original condition that lamp 36, which was energized when switch 46 was actuated, continue to be energized and thus signal the existence of an emergency situation which requires investigation. The security guard in the lobby 14, for example, could conceivably have turned his head away from the light 36 just at the time that the occupant of apartment 10 momentarily actuated the "panic" switch 46. To achieve this objective, it is necessary merely to include a holding circuit for the lamp 36. This and other such features, for completeness sake, are therefore illustrated in FIG. 3. However, it will be understood that the additional features of FIG. 3 are optional and need not be included in a combination bell and security circuit in order to practice the within invention. This fact is demonstrated by the circuit of FIG. 2 which does practice the invention, and yet excludes these optional features.

With the above understanding, a description of the circuit of FIG. 3 will now be provided. FIG. 3 duplicates much of the content of previously described FIG. 2 and therefore for brevity's sake the description of this duplicated content will not be repeated. Similarity in this construction and mode of operation of components previously described in connection with the circuit of FIG. 2 is signified by the use of the same reference numerals used for such component in FIG. 2.

One of the simplifications of the circuit of FIG. 2 that has been embodied in the circuit of FIG. 3 is the use of a single battery means to serve as the direct current source for both the call button or communication circuit, namely source 22, and also as the direct current source for the security circuit, namely source 38. This is signified in FIG. 3 by the use of both reference numerals 22 and 38 in connection with the battery means shown therein. Although a single battery means 22, 38 is used, the polarity thereof is in reverse relation to the call button or communication circuit vis-a-vis the security circuit. Thus, the bias of the diode 54 is effective in allowing battery operation only in the polarity of the call button circuit to, in turn, cause the operation of the bell or buzzer 24, but it does not allow the polarity which operates the security circuit from inadvertently also operating the bell or buzzer 24. This is demonstrated by the following tracing of the circuit of FIG. 3. Assuming that call button 16 is depressed, the circuit including the battery 22, 38 is complete in relation to the relay coil 60 thereby causing movement of the relay arm 44 and thus also movement of switch 42 and of switch 62 from their positions illustrated in full line into their positions illustrated in phantom perspective in FIG. 3. Assuming that the caller holds button 16 in its depressed condition so that switch 62 maintains its phantom perspective position, this has the effect of connecting the negative terminal of the battery source via the conductor 34, the conductor 26, and the closed contacts 50 to the conductor 52 of the diode 54. Because of the favorable bias of the diode 54, the signal is transmitted to the bell or buzzer 24 and then via the conductor 28 to the positive terminal of the battery source. Since this effectively completes the circuit, the bell or buzzer 24 will operate and thereby provide an appropriate signal to the occupant of the apartment associated with call button 16. This signal is appropriately responded to by depressing button 30 in the apartment which operates the door-opener 32.

During the time that the call button 16 is depressed, one can trace a circuit from the positive terminal through the call button 16, the relay coil 60, and through the phantom illustrated position of switch 62 to the conductor 26. From conductor 26, the signal can pass through the contacts 50 to the conductor 52 of the diode 54. However, the positive signal will not pass through the diode 54 because of the bias of said diode and thus the bell or buzzer 24 which should not be operated at this time, will, in fact, not be operated by the battery source 22, 38. Stated another way, the bell or buzzer 24 is operated only by the polarity of the battery source that operates the call button or communication circuit, and not by polarity of the same battery source as it is arranged to power the security circuit.

Another convenience of the FIG. 3 circuit that is not possessed by the FIG. 2 circuit is the simultaneous operation of the security circuit switch 42 upon selection of one of the call button switches, as exemplified by button 16, by reason of an electrical interconnection therebetween, rather than by virtue of a mechanical interconnection, as was the case and as is represented by connection 44 of FIG. 2. That is, the interconnection of these switches identified by reference numeral 44 in FIG. 3 is electrical rather than mechanical. This has already been explained wherein it has been noted that switch 42 is controlled by relay plunger 44 which is urged through movement in response to the energization of the relay coil 60 whenever a call button is depressed connecting relay 60 to the battery source 22, 38.

Another convenience, of a conventional nature, embodied in the circuit of FIG. 3 and not in that of FIG. 2 is a holding circuit for the emergency signal light 36. As already noted, it is desirable that when a security switch in one of the apartments is operated that this result in the energization of the light bulb 36 associated with that particular apartment, and that the light bulb remain lighted an adequate period of time so as to make sure that this condition is detected by security personnel. To this end, the FIG. 3 circuit includes a relay 64 having pivotally mounted switch arms 66 and 68 that are urged through a pivotal traverse between their full line and phantom line positions as a result of being mounted on a relay plunger 70 that, in a well known manner, is urged through movement whenever relay coil 72 is energized. In this regard, the tracing of the circuit of FIG. 3 will indicate that relay coil 72 is not energized in the full line positions of the various switch arms of this circuit, including particularly the full line positions of the switch arms 66 and 68 of relay 64. However, if it is assumed that security switch 46 in apartment 10 is closed, as will occur in an emergency situation, a tracing of the circuit will demonstrate the energizing of the signal light 36 and also the operation of relay 64 in such a manner as to prolong the duration of operation of said light 36. More particularly, starting with the negative terminal of the battery 22, 38, the circuit can be traced through the relay coil 72, the full line position of switch 42, and through the conductor 26 to the security switch contacts 48 and the switch arm 46 bridging these contacts. That is, since switch arm 46 is closed across contacts 48, the circuit is completed to the positive terminal of the battery source 22, 38 through conductors 58 and 28. As a result, relay coil 72 is energized which results in movement of the relay plunger 70 and the switch arms 66 and 68 assuming their phantom perspective positions illustrated in FIG. 3. One immediate consequence is that relay coil 72 is connected to the battery source 22, 38 through switch arm 42 and through switch arm 68, thereby bypassing the security switch 46. As a result, relay coil 72 remains energized even if the security switch 46 is opened.

As a consequence of switch arm 66 of relay 64 assuming its phantom line position signal light 36, which it will be assumed is associated with the apartment 10 in which the security switch 46 is operated, is connected across the battery source 22, 38 and is thus energized to signal to security personnel the existence of an emergency situation in the apartment identified with the particular signal light 36.

Another conventional-type convenience that would be embodied in a commercial adaptation of the within invention that is exemplified by the circuit of FIG. 3 would be the arrangement of the individual signal lights 36 in a console and with each such signal 36 being associated with a particular apartment. This console (not shown) could advantageously be located in the lobby area 14, or possibly in a special security room or area.

From the description already provided, it should be readily apparent that other conventional type conveniences can be embodied in the circuit of FIG. 3, as for example, a master switch (not shown) which disenables one of the circuits without necessarily interfering with the operation of the other circuit.

In summary, it should be readily appreciated that there has been described herein a combination communication and security circuit which advantageously utilizes the existing wiring from the powering electrical source, namely conductors 26 and 28, as well as the common wire 35 for the door-opener, which are part of the conventional call button and reply, or communication, circuit which has already been laid between the lobby and the individual apartments of an apartment building. The saving that is achieved by avoiding the need to duplicate this wiring in the practice of the within invention is significant. In part, the ability to use this existing wiring is due to a number of noteworthy aspects which characterize the circuit implementing the within invention, as heretofore described. One such noteworthy aspect is the recognition that while the individual electrical circuits which provide the communication and security functions, of course, have to be energized by an electrical source, that a DC source should be selected for this purpose, and that by using a reverse polarity for each of the individual circuits in conjunction with a properly biased diode, that this can effectively avoid the inadvertent powering of one circuit while the other circuit is operating. Another noteworthy aspect is the use of the existing wiring to provide the security function by having a main switch 42 in the security circuit normally closed and the circuit therefore in imminent condition to be operated, as when this circuit is completed by the closing of the security switch 46. Thus, the security function is provided during non-operation of the communication circuit, which is the prevalent situation. To put it another way, the communication circuit is the one having the discontinuity embodied therein in the form of the normally open call button, and said discontinuity is removed, of course, by the closing of the call button when it is desired to use the communication circuit, and this, fortunately, is required to be done infrequently as a practical matter.

Another distinguishing feature which contributes to the effectiveness of the within combined communication and security circuit is the interrelation of the operation of a selected normally open call button switch with the normally closed switch 42 of the security circuit. That is, it is only when a normally open call button is closed that the normally closed switch 42 is opened, and thus it is that only when the communication circuit is operational is the security circuit non-operational. Thus, from a practical point of view, the communication circuit which is infrequently used has, as it should, the normally open call button switches, whereas the security circuit which should be in a condition to provide an emergency signal at all times is, in actual fact, in condition to do so, because it embodies the normally closed switch 42 and has as the only open switch therein the security switch which, of course, identifies the existence of an emergency by its closing.

The foregoing and other essential operating parameters for a combination communication and security circuit according to the present invention are illustrated, and have been described, in connection with FIG. 2. The basic requirements of the circuit of FIG. 2 are, of course, compatible with conventional-type improvements, such as the improvements illustrated and described herein in connection with the circuit of FIG. 3. These improvements, however, are not to be deemed to be a necessary part of the invention. Similarly, a latitude of modification, change, and substitution is intended in the foregoing disclosure, and in some instances some features of the invention illustrated herein will be employed without a corresponding use of other features. Accordingly, it is appropriate that the appended claims be construed broadly and in a manner consistent with the spirit and scope of the invention herein.

What is claimed is:

1. A combination communication and security circuit for an apartment building having apartments and a lobby, comprising:
   a first battery having positive and negative terminals,
   a bell means located in each apartment and having positive and negative connections on each said bell means,
   a first conductor connecting said positive battery terminal to said positive connection of each said bell means,
   a plurality of normally open call button means located in the building lobby and connected with said negative battery terminal, each said call button means being associated with a particular one of the building apartments and operable for remote signalling of the particular apartment from the lobby,
   a second conductor associated with each building apartment and connecting a corresponding one of said call button means with the negative connection of the bell means in the particular apartment with which said call button means and second conductor are associated for operating said bell means to signal the particular apartment when the corresponding normally open call button means is closed, a second battery having positive and negative terminals, a normally open alarm switch located in each apartment for initiating an alarm signal and connected between said first and second conductors, alarm means associated with each apartment and comprising series-connected light-signalling means in the building lobby for identifying the apartment from which an alarm signal is initiated and a normally closed enabling switch normally enabling operation of said light-signalling means, said second battery and said alarm means being series-connected between said first conductor and said second conductor with a polarity such that said second battery positive terminal communicates with said second conductor and said second battery negative terminal communicates with said first conductor, a diode in series connection between each said negative bell means connection and said correspondingly-associated second conductor and effective for unidirectional signal transmission therethrough so as to prevent operation of said bell means by said second battery, and link means between each said normally closed enabling switch and the corresponding normally open call button means associated with a particular apartment for opening said enabling switch when said call button is closed so as to disable said light-signalling means in the building lobby during operation of said call button means.

* * * * *